United States Patent [19]

Mager

[11] Patent Number: 5,808,435
[45] Date of Patent: Sep. 15, 1998

[54] MICROPOSITIONING DEVICE FOR DISK HEAD TESTING SYSTEM

[75] Inventor: Michael Mager, San Jose, Calif.

[73] Assignee: KMY Instruments, San Jose, Calif.

[21] Appl. No.: 657,039

[22] Filed: May 28, 1996

[51] Int. Cl.$^6$ .................................. G05B 11/18
[52] U.S. Cl. ...................... 318/593; 318/652; 360/78.05; 360/165
[58] Field of Search .......................... 318/592–4, 568.18, 318/567–568.1, 652, 560, 565; 359/577–579, 824; 360/75–78.15, 105–106; 369/135–137, 144, 43, 44.11–44.42, 53, 176

[56] References Cited

U.S. PATENT DOCUMENTS

| | | | |
|---|---|---|---|
| 3,818,341 | 6/1974 | Burdick | 324/163 |
| 3,900,782 | 8/1975 | Hammerschmitt | 318/634 |
| 3,904,945 | 9/1975 | Hassan et al. | 318/593 |
| 4,087,715 | 5/1978 | Myer | 310/317 |
| 4,223,257 | 9/1980 | Miller | 318/594 |
| 4,227,182 | 10/1980 | Ogasawara et al. | 340/870.37 |
| 4,309,730 | 1/1982 | Sanderson | 360/77 |
| 4,326,155 | 4/1982 | Griebeler | 318/576 |
| 4,327,383 | 4/1982 | Holt | 360/45 |
| 4,333,116 | 6/1982 | Schoettle et al. | 360/78 |
| 4,506,154 | 3/1985 | Scire | 250/442.1 |
| 4,561,028 | 12/1985 | Guisinger | 360/77 |
| 4,694,477 | 9/1987 | Siddall | 378/34 |

(List continued on next page.)

FOREIGN PATENT DOCUMENTS

| | | | |
|---|---|---|---|
| 7-192346 | 7/1995 | Japan | G11B 13/00 |
| 7-210924 | 8/1995 | Japan | G11B 13/00 |
| 1232410 A1 | 5/1986 | U.S.S.R. | |

OTHER PUBLICATIONS

Bonse, M.H.W., "Finite–element modelling as a tool for designing capacitive position sensors", Sensors and Actuators A (Physical), (Jan.–Feb. 1995), vol. A46, No. 1–3, pp. 266–269.

Desogus, et al., "Capacitive sensors coupled to a scanning tunneling microscope piezoscanner for accurate measurements of the tip displacements", Journal of Vacuum Science & Technology B, Second Series, vol. 12, No. 3, May./Jun. 1994, pp. 4–6.

Peters, et al., "an inexpensive synchronous detector and its application to differential capacitance sensors", Review of Scientific Instruments (Aug. 1992), vol. 63, No. 8, pp. 3989–3992.

Sanada, K., "Noncontact evaluation of capacitance disk memory with ferroelectric/semiconductor structure", Japanese Journal of Applied Physics, Part 1 (Nov. 1994), Vol. 33, No. 11, pp. 6383–6388.

*Primary Examiner*—David S. Martin
*Attorney, Agent, or Firm*—Fliesler Dubb Meyer & Lovejoy

[57] ABSTRACT

A micropositioner has a coarse positioner and a fine positioner, with a separate closed loop control circuit for the fine positioner. A disk head being positioned over a disk is attached to the stage of the fine positioner. The fine positioner includes a parallelogram flexure having first and second opposite sides attached respectively to the coarse positioning stage and the fine positioning stage. A piezoelectric translator translates the second side of the flexure relative to the coarse positioning stage. In order to sense displacement of the fine positioning stage relative to the coarse positioning stage, a differential electric field sensor is employed. The sensor includes a pair of side plates both mounted fixedly relative to one of the stages and opposing each other to create an electrical field between them, and a probe plate mounted fixedly relative to the other of the two stages and between the two side plates. As the second stage moves relative to the first, the voltage sensed by the probe plate is fed back to control the piezoelectric translator until the probe voltage indicates that the fine displacement amount matches a desired fine displacement amount indicated by a command signal. In an embodiment, the fine positioner feedback loop controls the voltages applied to the side plates such that the voltage sensed by the probe plate is zero whenever the fine positioner is at equilibrium.

13 Claims, 5 Drawing Sheets

U.S. PATENT DOCUMENTS

| | | | |
|---|---|---|---|
| 4,702,101 | 10/1987 | Abbe et al. | 73/1 R |
| 4,722,010 | 1/1988 | Suzuki et al. | 360/46 |
| 4,727,278 | 2/1988 | Staufenberg, Jr. et al. | 310/328 |
| 4,811,246 | 3/1989 | Fitzgerald et al. | 364/550 |
| 4,823,205 | 4/1989 | Hannon et al. | 369/14 |
| 4,829,545 | 5/1989 | Guzik et al. | 375/120 |
| 4,831,246 | 5/1989 | Wallentine et al. | 250/20 J |
| 4,836,916 | 6/1989 | Kondo et al. | 209/538 |
| 4,843,293 | 6/1989 | Futami | 318/593 |
| 4,850,695 | 7/1989 | Mikuriya et al. | 356/237 |
| 4,893,071 | 1/1990 | Miller | 324/660 |
| 4,902,971 | 2/1990 | Guzik et al. | 324/212 |
| 4,958,839 | 9/1990 | Guzik et al. | 279/2 R |
| 4,988,945 | 1/1991 | Nagase | 324/175 |
| 5,015,850 | 5/1991 | Zdeblick et al. | 250/306 |
| 5,027,645 | 7/1991 | Leitmeier et al. | 73/116 |
| 5,128,812 | 7/1992 | Uno | 360/78.06 |
| 5,198,777 | 3/1993 | Masuda et al. | 324/671 |
| 5,204,932 | 4/1993 | Shinohara et al. | 388/815 |
| 5,220,408 | 6/1993 | Mager | 356/372 |
| 5,229,679 | 7/1993 | Higuchi et al. | 310/328 |
| 5,254,946 | 10/1993 | Guzik | 324/262 |
| 5,257,093 | 10/1993 | Mager et al. | 356/375 |
| 5,262,707 | 11/1993 | Okazaki et al. | 318/592 |
| 5,269,190 | 12/1993 | Kramer et al. | 73/822 |
| 5,270,883 | 12/1993 | Umeyama | 360/67 |
| 5,355,261 | 10/1994 | Taratorin | 360/53 |
| 5,359,474 | 10/1994 | Riederer | 360/78.05 |
| 5,382,887 | 1/1995 | Guzik et al. | 318/652 |
| 5,394,096 | 2/1995 | Meyer | 324/686 |
| 5,424,597 | 6/1995 | Gloss et al. | 310/328 |
| 5,455,720 | 10/1995 | Norton | 360/46 |
| 5,463,259 | 10/1995 | Zimmer | 307/106 |

MICROPOSITIONING DEVICE FOR DISK HEAD TESTING SYSTEM

FIELD OF THE INVENTION

This invention relates generally to the field of positioning devices. More particularly, this invention relates to the field of micropositioning devices which can be used to accurately adjust the displacement of an element affixed thereto, specifically a disk drive head being micropositioned over a disk track for testing.

BACKGROUND OF THE INVENTION

The accurate movement of electrical and mechanical devices with micron and submicron precision has many practical applications. However, existing micropositioning devices often do not adequately account for the errors created by thermal expansion and mechanical vibration, and the electrical circuitry employed in some designs can generate additional electromagnetic disturbances such as stray or parasitic capacitance, which can further impede accurate positioning.

For example, advances in compressing the data tracks on magnetic disks in the computer industry have resulted in a concomitant need for increased positioning accuracy in the magnetic heads commonly used in computer disk drives. U.S. Pat. No. 5,382,887 (incorporated by reference herein) attempts to address this need in part by disclosing a method and apparatus for compensating positioning error in magnetic head and magnetic disk testers. The disclosed device employs a pair of linear encoders installed on lateral sides of a carriage mechanism, with the magnetic head mounted on the carriage and moveable relative to a hard disk in a radial direction. Outputs of the linear encoders are supplied to an external arithmetic unit, which calculates the arithmetic mean of the outputs and transmits the resulting signal via a feedback line to a piezoelectric translator. Coarse positioning is performed by a stepper motor and lead screw, and fine positioning is performed by a piezoelectric translator, but only a single feedback loop is used for controlling overall position of the magnetic head relative to the disk. The patent discloses that fine positioning of the magnetic head by the piezoelectric translator and feedback system can achieve an accuracy of approximately 0.02 to 0.05 $\mu$m (20 to 50 nm).

However, while linear encoders are useful for sensing displacement over large ranges as required in the '887 design, they have a number of important drawbacks. First, their physical size generally requires them to be placed at a distance from the disk head whose position is being measured, resulting in possible errors introduced in the mechanical members which attach the linear encoders to the disk head. Such errors are often beyond the sensing point of the closed loop control system and therefore cannot be automatically corrected when they occur. The '887 patent teaches an elaborate averaging solution in order to address this problem, but such a solution assumes that the head will be located at exactly the midpoint between the points where the two linear encoders are attached. That assumption might be false, due to temperature and vibration effects.

Second, while linear encoders can operate over the large displacement range required for covering all tracks of a typical disk, their resolution is limited. For example, according to the '887 patent, the resolution of the linear encoders used in that design is only 0.01 $\mu$m (10 nm). Such a tradeoff between range and resolution is common among displacement measurement devices, such that even if the linear encoders in the '887 apparatus were to be replaced by other kinds of sensors capable of sensing displacement over the same range, it is likely that resolution will not be improved substantially. On the other hand, higher resolution displacement measurement devices typically operate over only a small range of displacements.

One example of a high resolution displacement measurement mechanism which is greatly limited in its useful range is a capacitive sensor. A capacitive sensor is described in Desogus, et al., "Capacitive Sensors Coupled to a Scanning Tunneling Microscope Piezoscanner for Accurate Measurements of the Tip Displacements," Jrnl. Vacuum Sci. Tech. B vol. 12, no. 3 (May/June 1994), incorporated herein by reference. However, prior art designs incorporating these sensors have thus far been unable to eliminate the nonlinearity brought about by parasitic or stray capacitance. Stray capacitance is inherent capacitance in a place where it can be detrimental, such as between the turns of a coil or between adjacent areas in a circuit. Design improvements and measurement methods such as those described herein, are still needed to further reduce, and preferably eliminate, the effects of stray capacitance created by the proximity of the various sensor components and their relative impedance characteristics.

Accordingly, what is needed is a micropositioner that can provide superior resolution at submicron levels, while minimizing the inaccuracies caused by mechanical vibrations and thermal expansion, and without engendering uncorrectable position errors. It is also desirable that this improved micropositioner have a superior position sensing device that is capable of detecting submicron linear displacement while substantially eliminating electromagnetic disturbances within the feedback control loop.

SUMMARY OF THE INVENTION

Roughly described, the invention involves a micropositioner having a coarse positioner and a fine positioner, with a separate closed loop control circuit for the fine positioner. The coarse positioner positions a first stage relative to a reference position, and the fine positioner positions a second stage relative to the first stage. The disk head being positioned is attached to the second stage. Since the fine positioner moves the disk head over only a small range of displacements, a high resolution displacement sensor can be used in the fine positioner feedback loop.

The fine positioner can include a parallelogram flexure having first and second opposite sides and further having third and fourth opposite sides, the first side being mounted fixedly relative to the first stage and the second stage being mounted fixedly relative to the second side. A fine positioning mechanism, such as a piezoelectric translator, is mounted at one end fixedly relative to the first stage, and mounted at the other end fixedly relative to the second side of the parallelogram flexure. The fine positioning mechanism accomplishes the fine positioning of the second stage relative to the first stage.

In order to sense displacement of the second stage relative to the first, with very high resolution and repeatability, a novel differential electric field sensor can be employed. The sensor includes a pair of electrical side plates both mounted fixedly relative to either the first or second stage and opposing each other so as to create an electrical field between them, and an electrical probe plate mounted fixedly relative to the other of the first and second stages and extending into the gap between the two side plates. As the second stage moves relative to the first stage, the fine positioning closed loop feedback system senses the differential in the electric field on either side of the probe plate and controls the positioning mechanism to translate said second stage until the voltage sensed by the probe plate indicates that the fine displacement amount matches a desired fine displacement amount. In one embodiment, in order to minimize the effects of stray capacitance and other electrical interference, the fine positioner feedback loop is designed to control the voltages applied to the opposing pair of plates such that the voltage sensed by the probe plate is zero whenever the fine positioner is at equilibrium.

GENERAL DESCRIPTION OF THE INVENTION

Figure 1:
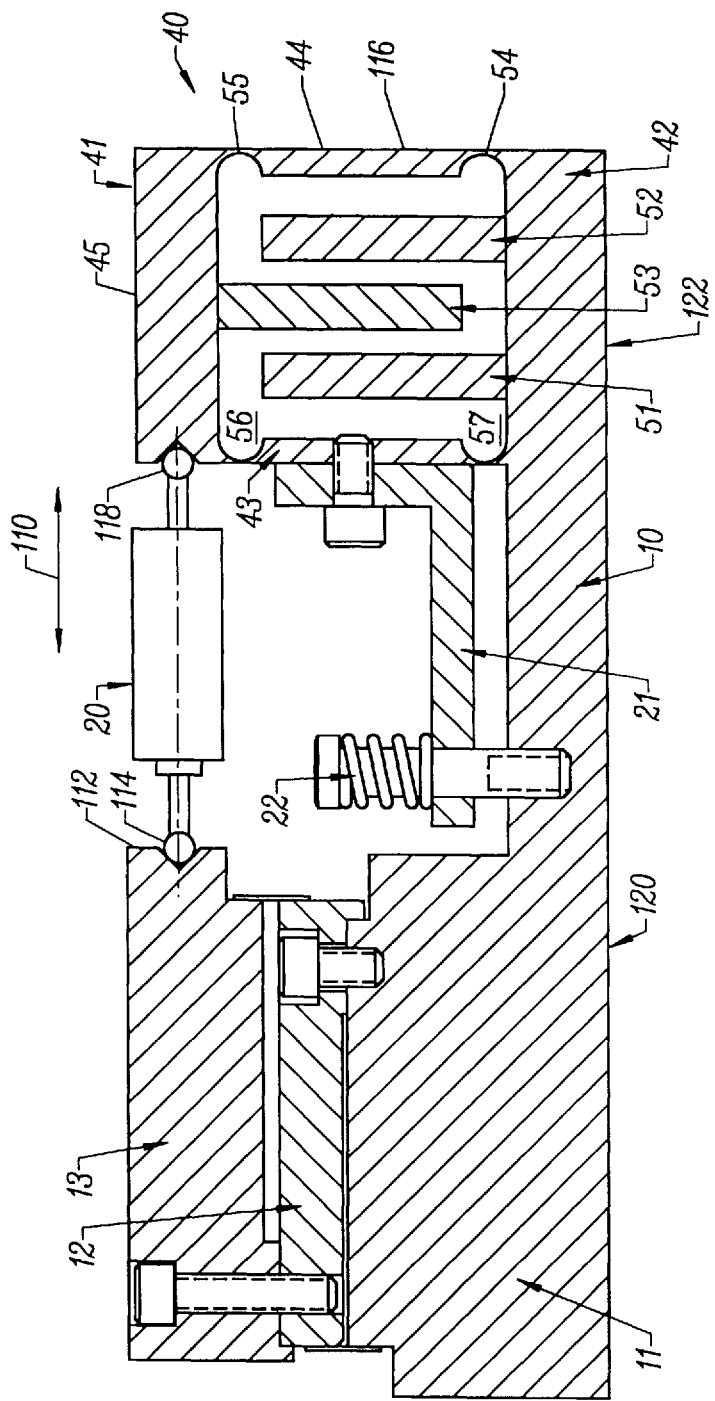
FIG. 1 is a cross-sectional view of an embodiment of the present invention, with a differential electric field sensor housed within a flexible parallelogram stage assembly.

The present invention contemplates a micropositioning device incorporating a translating means for fine positioning, such as a piezoelectric translator, which is further coupled to a unique micropositioning stage assembly and a sensor component in a feedback control loop. In an embodiment, the sensor component comprises the novel differential electrical field sensor described herein, and the stage assembly comprises a flexible parallelogram structure. In an embodiment, the differential field sensor of the present invention is housed within the flexible parallelogram stage assembly. The micropositioner of the present invention permits improved resolution of linear displacement by the piezoelectric translator of less than approximately 10 nanometers, while substantially eliminating environmental and electromagnetic problems in both the micropositioner itself and in the feedback loop used to control and correct the positioning of the piezoelectric translator.

While the use of piezoelectric elements in micropositioning devices is well known in the prior art, the prior art designs have as yet been unable to adequately eliminate the environmental and electromagnetic disturbances that hinder a precise determination of the displacement created by the translating means. For example, the long mechanical path length mandated by the use of the linear encoders in U.S. Pat. No. 5,382,887 fails to sufficiently minimize the mechanical vibrations created by the carriage assembly. In addition, the design fails to account for the effects of thermal expansion on the accuracy of the displacement measurement.

In an aspect of the present invention, these deficiencies are overcome by replacing the linear encoders with a flexible stage assembly coupled to a sensor component in a closed feedback loop system. The shorter mechanical path length created by this novel arrangement substantially minimizes positioning error due to environmental disturbances such as mechanical vibration or thermal expansion. In addition, the present invention further contemplates the incorporation of suitable thermocompensation materials into specific components of the present invention to assist in temperature compensation and to further reduce the effects of thermal expansion.

Ideally, a linear relation between the command signal provided by a controller and the actual displacement by the piezoelectric element can be achieved. In an aspect of the invention, the novel differential electric field sensor and control circuit solves the foregoing problem, and effectively eliminates any positioning error due to electrical disturbances, including stray capacitance.

While primarily important for positioning disk drive heads relative to disks for testing, it is contemplated that both the differential field sensor and the micropositioner of the present invention will have broad application for any type of instrumentation requiring precise linear movement of a stage assembly with a resolution of better than 0.005 $\mu$m.

DETAILED DESCRIPTION

The following description serves to illustrate the preferred embodiments and other aspects of the present invention, and is not to be construed as limiting the scope thereof.

In considering the micropositioner of the present invention some definitions are helpful. For example, "actual displacement" is the actual displacement of the stage when moved by the translating means, taking into account such factors as environmental and electromagnetic disturbances. This is compared with the intended or desired displacement. For example, a command signal may be transmitted to the translating means to move the stage 0.005 $\mu$m; however, due to different disturbances, the stage may actually move 0.006 $\mu$m. The 0.006 $\mu$m is the actual displacement, whereas 0.005 $\mu$m is the desired displacement. A "stage" is a platform suitable for mounting any type of workpiece for micropositioning, such as a magnetic disk head or another micropositioner.

Note that all positioning described herein refers to positioning in a single dimension. Depending on the apparatus, positioning can also occur in a second and third dimension as well, but the apparatus described herein is concerned only with the position in the first dimension. Any additional displacement in the other two dimensions is neither detected nor controlled by the apparatus described herein. Similarly, fixed offsets in the second and third dimensions are neither detected nor controlled. Thus, when one member is referred to herein as being mounted "fixedly in a first dimension" relative to a second member, movements in the second and third dimensions are not precluded.

I. FINE POSITIONER

As described more fully hereinafter, an embodiment of the invention includes a coarse positioner which positions a first stage relative to a reference position (such as the position in a first dimension of the spindle of a spinning disk), and a fine positioner which positions a second stage relative to the first stage. FIG. 1 illustrates an embodiment of a fine positioner. It includes a base unit 10 attached at a first end 112 to a first end 114 of a translating means 20, such as a piezoelectric translator. Piezoelectric translators suitable for use in the micropositioner of the present invention are well known in the art, and are generally operative for producing a displacement in response to an applied electrical potential. In response to the applied signal the piezoelectric member either extends or contracts in a linear direction as a result of the increase or decrease, respectively, of the diameter of the piezoelectric member. An example of an appropriate piezoelectric translator is a Model P.840.10 manufactured by Physics Instruments, Inc., Waldbonn, Germany. The piezoelectric translator 20 is oriented to provide its controllable extension in a first dimension indicated by arrow 110.

A micropositioning stage assembly 40 is mounted between a second end 116 of the base unit 10 and a second end 118 of the translating means 20. In an embodiment, the stage assembly 40 comprises a flexible parallelogram frame having opposite top 41 and bottom 42 sides, and two opposite supporting sides 43 and 43, wherein each side further incorporates bending flexures of any kind, such as the indented grooves 54–57 machined into the four corners of the flexure as shown in FIG. 1. The indented grooves 54–57 result in thinner walls at the corners of the parallelogram frame, which allow the frame to "flex" at the points of the indented grooves. It is contemplated that the stage assembly 40 can be an integral part of the base unit 10, or alternatively can be fixedly attached to the base unit 10 by any rigid means. In one embodiment, the stage assembly 40 is attached by way of screws to the base unit 10.

In the embodiment, the stage assembly 40 is further coupled between the translating means 20 and the base unit 10 by means of a preloading bracket 21 and a preloading spring 22, such that a change in the length of the translating means 20 will force the top 41 of the stage assembly 40 to follow the movements of the translating means 20. Since the flexible parallelogram frame is geometrically constrained, the top 41 will always remain parallel to the bottom 42, while the bottom 42 remains fixed to the base unit 10. The preload spring results in improved performance when using piezo translators as the translating means. This is due to the fact that piezo translators are efficient at exerting force when expanding, but not very efficient when contracting. Therefore, the preload spring assists the piezo translator in contracting and returning the stage assembly 40 back to its original position after the piezo translator has expanded. The translating means is supported between the base unit 10 and the top 41 of the stage assembly 40 in a way that only axial forces (no bending forces or moments) can be applied to the translating means 20. A workpiece such as a magnetic disk drive head is then coupled to a stage 45 on the top 41 of the stage assembly 40, and it is the micropositioning of this workpiece that the present invention seeks to control.

Note that FIG. 1 shows the second end 118 of the piezoelectric translator 20 attached fixedly relative to the top surface 41 of the parallelogram flexure 40. It will be appreciated that because of the geometry of a parallelogram, in another embodiment the translator could be attached to any of the four sides of the flexure, except the bottom 42.

II. TEMPERATURE COMPENSATION

It is contemplated that the base unit 10 of the present invention can be either a solid structure of uniform composition or, in an embodiment, can be composed of two or more different materials attached together. This embodiment is motivated by the physical fact that every material changes its geometrical dimensions with changes in temperature. Therefore, when the different components or elements are chosen to have specific geometrical lengths, and specific temperature coefficients of linear expansion are determined for each of them, the base unit 10 can be designed to compensate for any geometrical length changes caused by temperature fluctuations.

Depending on the type of displacement sensor used, temperature-induced expansion might not pose a problem if the workpiece is mounted sufficiently close to the sensor. This is because such expansion will be detected by the displacement sensor and fed back to cause an appropriate correction. However, the sensors having the finest displacement resolution often are also the same sensors that have the smallest range of utility. If such a sensor is used in the fine positioner of FIG. 1, temperature-induced expansion of certain components can easily move the sensor out of its range of operation.

Thus, in the embodiment shown in FIG. 1, the base unit 10 is composed of a base plate 11 with a temperature compensation plate 12 mounted at one end, and a piezo translator attachment fixture 13 mounted on the temperature compensation plate 12. The temperature compensation plate 12 and the piezo translator attachment fixture 13 can be made of any suitable materials having different temperature coefficients of expansion, and are geometrically designed to counteract the effects of thermal expansion on the micropositioning device.

More specifically, two paths of expansion are formed. The first path begins at a point (such as 120) where the base unit 10 is attached to a reference point (such as a coarse positioning stage). The first path extends from that point 120, through the base unit 10 in the first dimension 110, to a point (such as 122) where the bottom surface 42 of the parallelogram flexure 40 is attached to the base unit 10. The second path extends from the same point 120 where the base unit 10 is attached to the reference point, through the plates 12 and 13 and the piezoelectric translator 20 to the point 118 where the piezoelectric translator attaches to the top surface 41 of the parallelogram flexure. The materials and the lengths of the members are chosen such that at least in the first dimension, the total expansion per °C. of the first path is approximately equal to the total expansion per °C. of the second path.

It is not necessary that the expansion be identical, since small errors are automatically compensated for in the closed loop control circuit. It is necessary only that in normal conditions of operation, the two expansion amounts per °C. be close enough to maintain the displacement sensor within its range of operation.

III. THE SENSOR COMPONENT

The micropositioner of FIG. 1 further incorporates a sensor component (sensor means) and a control circuit to govern the positioning of the stage assembly 40 by the translating means 20. The sensor component can be advantageously located in the micropositioner design at almost any location consistent with its detection of the linear movement of the stage, so as to accommodate the particular application and the spacing requirements of the instrument or component being positioned. In the embodiment of FIG. 1, the sensor component is located within the stage assembly 40 itself.

It is also contemplated that any number of different kinds of commercially-available sensor devices can be advantageously incorporated into the present invention, such as capacitive, optical, holographic or LVDTV sensors. Certain sensors which have very good resolution, however, are difficult to mount and align properly. A typical prior art capacitive sensor, for example, requires two plates to be mounted parallel to each other, spaced by only about 7 $\mu$m. Such a unit is extremely difficult to assemble, and difficult to align properly because of the difficulty in finding and inserting shims that are small and thin enough.

In the embodiment of FIG. 1, the sensor component comprises the unique sensor described more fully below. This novel differential electric field sensor effectively eliminates any positioning error due to electrical disturbances, including stray capacitance, by providing a unique structural design and closed feedback loop. The closed feedback loop employs a unique measurement method which produces a linear relationship between a command signal voltage from a controller, and the displacement of the piezoelectric element. In addition, the opposing electric field plates can be mounted as far apart as 100 μm, thereby greatly simplifying assembly and alignment.

As shown in FIG. 1, the sensor component comprises the differential field sensor elements 51, 52, and 53 mounted within the stage assembly 40. As noted above, it is contemplated that the expansion and contraction of the translating means 20 will linearly displace the top 41 of the stage assembly 40 in relation to the bottom 42, thereby allowing micropositioning of a workpiece (such as 15 in FIG. 3) affixed to the stage 45 itself. The differential field sensor elements comprise first and second opposing electric field side plates 51 and 52, which are mounted to the bottom 42 of and within the stage assembly 40 such that they extend toward the top 41. A probe plate 53 is mounted to the top 41 of and within the stage assembly 40 such that it extends toward the bottom 42 and between the two side plates 51 and 52.

While the embodiment illustrated herein describes the opposing plates 51 and 52 as mounted to the bottom 42 and the probe plate 53 as mounted to the top 41, it should be apparent that they could be reversed while still maintaining the effectiveness of the invention's design. Similarly, the sensor elements could also be easily positioned outside the stage assembly 40 itself, so long as they are appropriately situated along the path of linear movement created by the translating means 20 so as to detect the extent of displacement in the first dimension.

IV. A METHOD OF MEASURING DISPLACEMENT

The differential field sensor elements 51, 52, 53 operate by the application of oppositely phased A.C. voltages to the two side plates 51 and 52. These applied voltages create an electric field between the two side plates 51 and 52, and at any point in time, this electric field varies linearly from one of the plates 51 to the other plate 52. If the voltage applied to the two side plates 51 and 52 are exactly opposite of each other, and the probe 53 is centered between the two side plates 51 and 52, the electric fields on either side of the probe 53 are equal and no voltage is generated in the probe 53. If, however, the probe 53 moves closer to one plate 51 or the other 52, the voltage sensed by the probe 53 deviates from zero. In an ideal case where the probe 53 has infinite impedance (i.e. no current flows through the probe), this voltage is directly proportional to the displacement of the probe 53 across the gap between the two opposing side plates.

However, because of stray (or parasitic) capacitance created between the probe 53 and the cables, additional voltage errors, not related to the displacement, can appear. (See FIG. 2.) Unfortunately, this stray capacitance is difficult to measure and even harder to eliminate, as is evident in the prior art discussed above. Moreover, this variable is non-linear to the displacement, and therefore considerably complicates the direct measurement of the displacement by a differential field sensor.

This problem is overcome by the method of the present invention, in which the amplitude of the A.C. voltage applied to one of the side plates 51 or 52 is increased while the amplitude of the A.C. voltage on the opposite side plate 51 or 52 is decreased, until the voltage at the probe 53 is zero. In that situation, the electric fields on both sides of the probe plate 53 are equal. The stray capacitance problem is therefore effectively eliminated, since the voltage at the probe 53 is now zero and there is thus no current in the probe to give rise to the problem.

Figure 2:
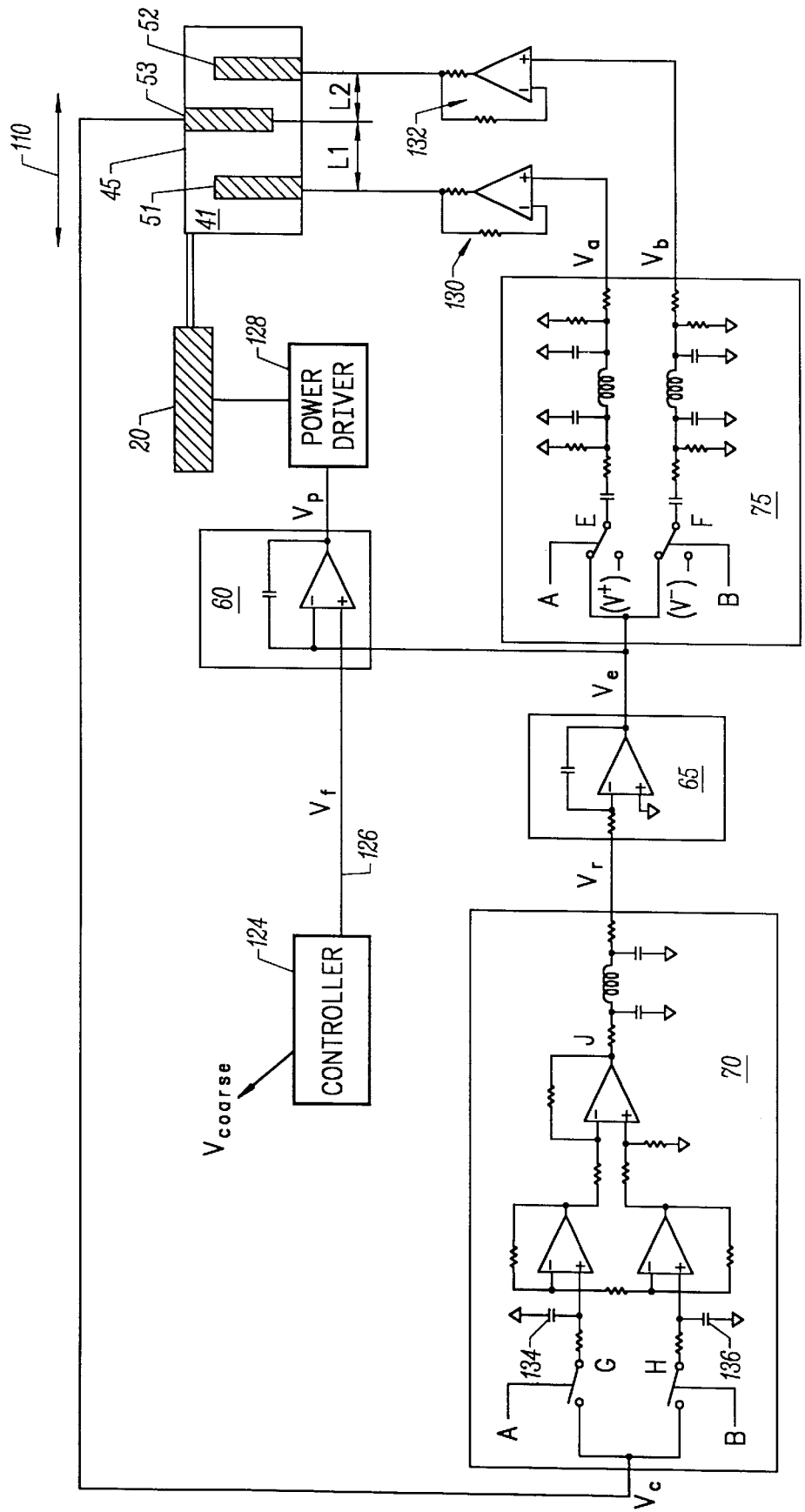
FIG. 2 is a schematic diagram of a control circuit used to detect and control the displacement of the differential field sensor by the piezoelectric translator.

The control circuit designed to act as a closed feedback loop to carry out the method of the present invention is shown in FIG. 2. A controller 124 provides a command voltage $V_f$ via a command signal line 126 to the non-inverting input of a differential integrator 60. The controller 124 also provides a coarse control voltage $V_{coarse}$ for controlling a coarse positioner stage. The output voltage $V_p$ of differential integrator 60 is connected to a power driver 128, the output of which drives the piezoelectric translator 20 to move the fine positioning stage 41 and thereby move the probe plate 53 in the first dimension 110. The voltage $V_c$ sensed by the probe plate 53 is connected to the input of a synchronous rectifier circuit 70 which, as will be seen, converts the A.C. voltage $V_c$ to a positive or negative D.C. voltage $V_r$, depending on whether the movement of the probe plate 53 was to the right or to the left. The resulting D.C. voltage $V_r$ is provided to the inverting input of a high-gain integrator 65, the non-inverting input of which is connected to ground. The output of integrator 65 represents a voltage $V_e$, and is provided to the inverting input of the integrator 60. $V_e$ is also connected to the input of a differential D.C.-to-A.C. convertor 75, which produces two voltage outputs $V_a$ and $V_b$. These signals are amplified by respective amplifiers 130 and 132, and applied respectively to the two opposing electric field plates 51 and 52.

Figure 2A:
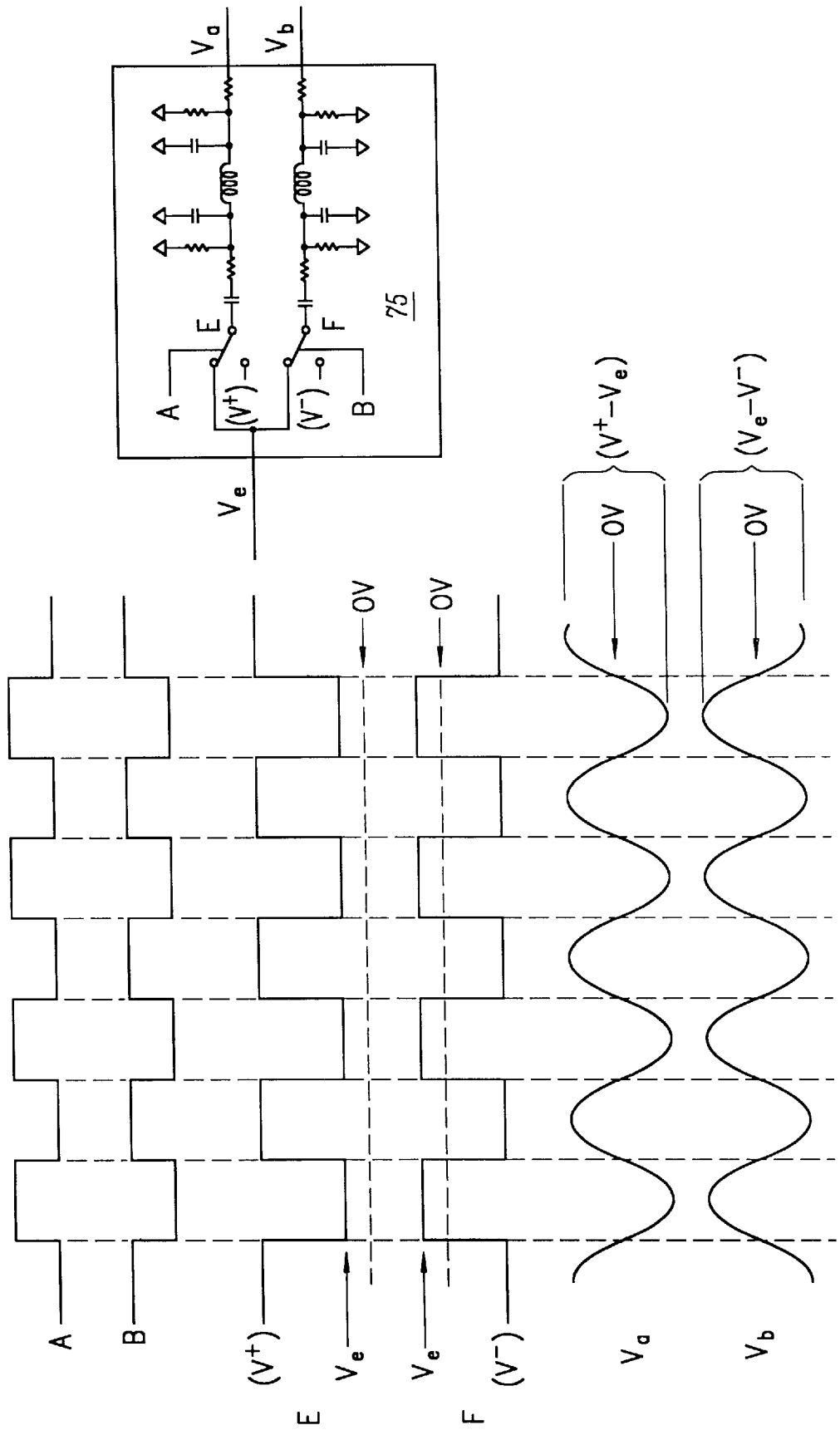
FIG. 2A is a schematic diagram of the switching circuitry of FIG. 2 and corresponding waveforms used to generate voltages applied to the opposing plates of the differential field sensor.

The operation of the D.C.-to-A.C. differential voltage convertor 75 will now be described with respect to the waveforms in FIG. 2A. This circuit operates in response to two signals A and B. Signals A and B are oscillating square wave signals from any conventional source such as an oscillator, for flipping the switches which feed points E and F. Signals A and B are out of phase by 180°. They can oscillate at almost any frequency, and in one embodiment, they oscillate at about 300 kHz.

When signal A is at a high level, the voltage at point E is equal to $V_e$. When signal A is at low level, the voltage at point E is equal to $V^+$. Therefore the waveform at point E switches between $V^+$ and $V_e$ as shown on FIG. 2A. Similarly, when signal B is at a high level, the voltage at point F is set equal to $V^-$. When the signal B is at a low level, the voltage at point F is set to $V_e$. Thus, when $V_e$ increases, the bottom level of waveform E will increase and the top level of waveform F will also increase. As a result, the waveform at point E will decrease in amplitude and the waveform at point F will increase in amplitude by the same amount. After filtering $V_b$ are the sine wave voltages applied respectively to the opposing electric field side plates 51 and 52. The two voltages are given by:

$$V_a = k\,(V^+ - V_e)\sin \omega t$$

and $$V_b = k\,(V^- - V_e)\sin \omega t,$$

where k is a constant of proportionality and $V^+$ and $V^-$ are predefined D.C. voltages between which $V_e$ ranges. Both signals oscillate about 0 volts, although this is not necessary for the operation of the system.

Figure 2B:
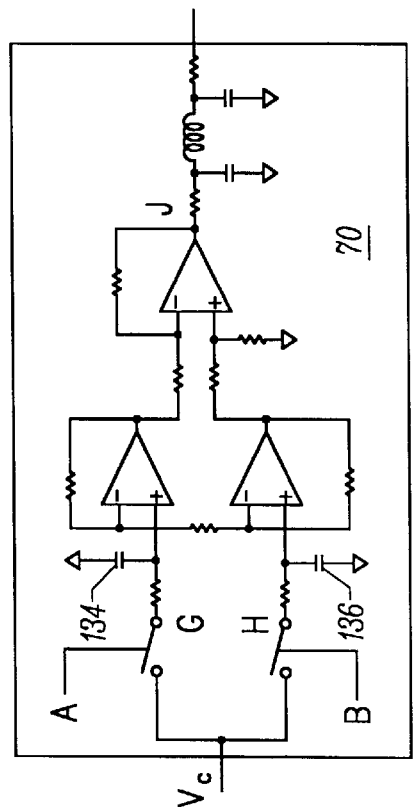
FIG. 2B is a schematic diagram of the synchronous rectifier circuitry of FIG. 2 and corresponding waveforms.
Figure 2B:
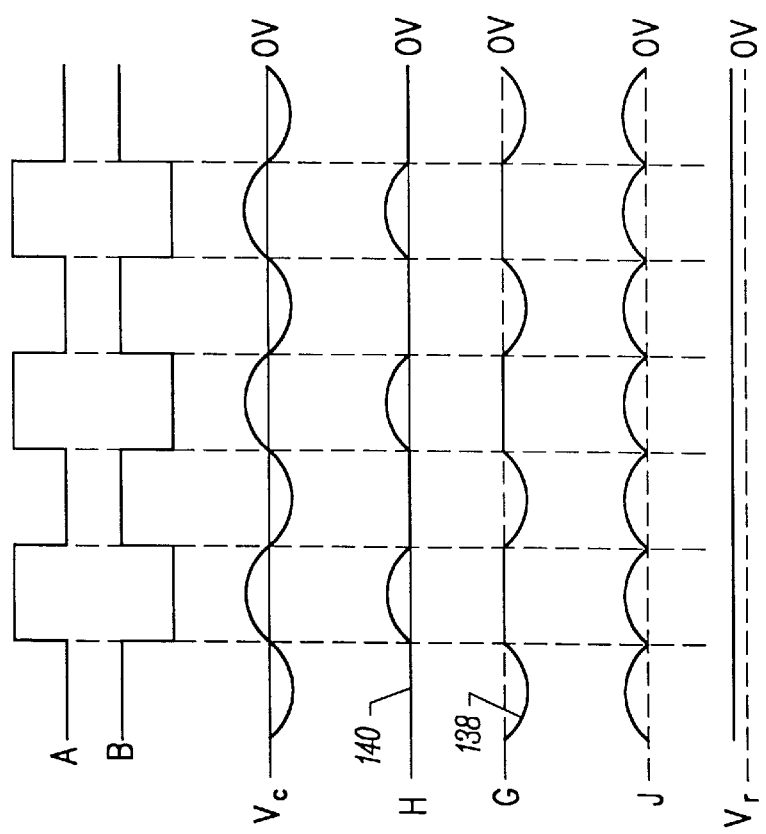

FIG. 2B shows the synchronous rectifier circuitry 70 which converts the A.C. voltage $V_c$ to a D.C. voltage $V_r$. It should be noted that the same signals A and B are also used by the synchronous rectifier circuitry 70 to flip the correspondingly coupled switches. When A is at a low level, it allows the voltage $V_c$ to charge capacitor 134 either positively or negatively, depending on whether $V_c$ is positive or negative in that half cycle. When A is at a high level, the switch isolates $V_c$ from the capacitor 134, which therefore retains its charge. The voltage at the output G of the switch is indicated in waveform 138 in FIG. 2B, for an example in which $V_c$ is negative in the half cycle during which A is low. Similarly, the signal B operating the other switch of the synchronous rectifier 70 produces a waveform at point H such as 140 in FIG. 2B, charging the capacitor 136 with $V_c$ only in the half cycles during which capacitor 134 is isolated from $V_c$. Thus, if capacitor 134 is being charged positively, then capacitor 136 is being charged negatively, and vice versa. Since the voltage at point J in the synchronous rectifier 70 is proportional to the difference between the voltages on capacitors 134 and 136, the waveform at point J represents a synchronously rectified version of $V_c$ (and may be positive or negative). After filtering, $V_r$ is a D.C. voltage which is equivalent to the average level of the waveform at point J.

Referring again to FIG. 2, the overall operation of the closed loop control circuit can now be described. Initially, note that the circuitry actually comprises two closed loops. The first loop generates a voltage $V_p$ which will causes the piezoelectric translator 20 to hold the fine positioning stage 45 at the desired displacement. The integrator 60 integrates the difference between the command voltage $V_f$ and the error voltage $V_e$, which as will be seen, linearly represents the current displacement of the probe plate 53 between the opposing plates 51 and 52. When $V_f$ is different from $V_e$, the integrator 60 will keep increasing (or decreasing) the voltage $V_p$, which will in turn cause the piezoelectric translator 20 to translate the stage 45 until the current position of the probe plate 53, as indicated by $V_e$, is once again equal to $V_f$. At this point, the positioner has reached the desired position.

The second loop generates the voltage $V_e$ to reflect the current position of the probe plate 53 between the two side plates 51 and 52. The voltages $V_a$ and $V_b$ are the two oppositely phased A.C. voltages applied to the two side plates 51 and 52. The system is calibrated so that the amplitudes of these two voltages are equal when the probe plate 53 is exactly centered between the two side plates 51 and 52. In this situation, the voltage $V_c$ sensed by the probe plate 53 is 0. When the fine positioning stage 45 moves, the probe plate 53 will be shifted to one side. The voltage $V_c$ sensed by the probe plate 53 will no longer be 0. Rather, $V_c$ will be an oscillating voltage having an amplitude which depends on the amount of displacement from center. The phase of the oscillating voltage $V_c$ depends on whether the stage 45 was moved to the left or to the right. Synchronous rectifier 70 will rectify $V_c$ to a positive or negative D.C. voltage $V_r$, as appropriate. When $V_r$ is non-0, the integrator 65 will continue to increase (or decrease) the voltage $V_e$. Correspondingly, the amplitudes of the oscillating voltages $V_a$ and $V_b$ applied to the two side plates 51 and 52 will increase or decrease in a complementary manner. Integrator 65 will continue to change $V_e$ until the voltage $V_c$ sensed by the probe plate 53 in its new position, returns to 0. At this time, integrator 65, stops integrating and holds the voltage $V_e$ constant. Therefore, $V_e$ represents the current position of the probe plate 53 relative to the two side plates 51 and 52. Notice that the second loop settles much more quickly than the first loop, ensuring that the first loop always has an accurate indication of the probe plate 53 current position.

It will be appreciated that the relationship of $V_e$ to the current position of the probe plate 53 between the two side plates 51 and 52, at equilibrium, is linear. Furthermore, since $V_e$ is brought equal to the command signal voltage $V_f$ when the fine positioning stage 45 position has reached equilibrium, $V_f$ is also linearly related to the position of the probe plate 53 between the side plates 51 and 52. Specifically, the relationship between position and $V_f$ is as follows: if $L_1$ is the distance between plate 51 and probe 53, and $L_2$ is the distance between plate 52 and probe 53, the relative distance between the probe 53 (and therefore the stage 45) and the side plate 51 will be given, at equilibrium, by:

$$\frac{L_1}{L_1+L_2} = \frac{V_f - V^-}{V^+ - V^-}$$

Such linearity is valuable for a number of reasons, including simplification of the calibration procedure. Specifically, only two data points are required to define the exact relationship between $V_f$ and $L_1$.

V. MICROPOSITIONING OF MAGNETIC HEAD AND DISK TESTING EQUIPMENT

Figure 3:
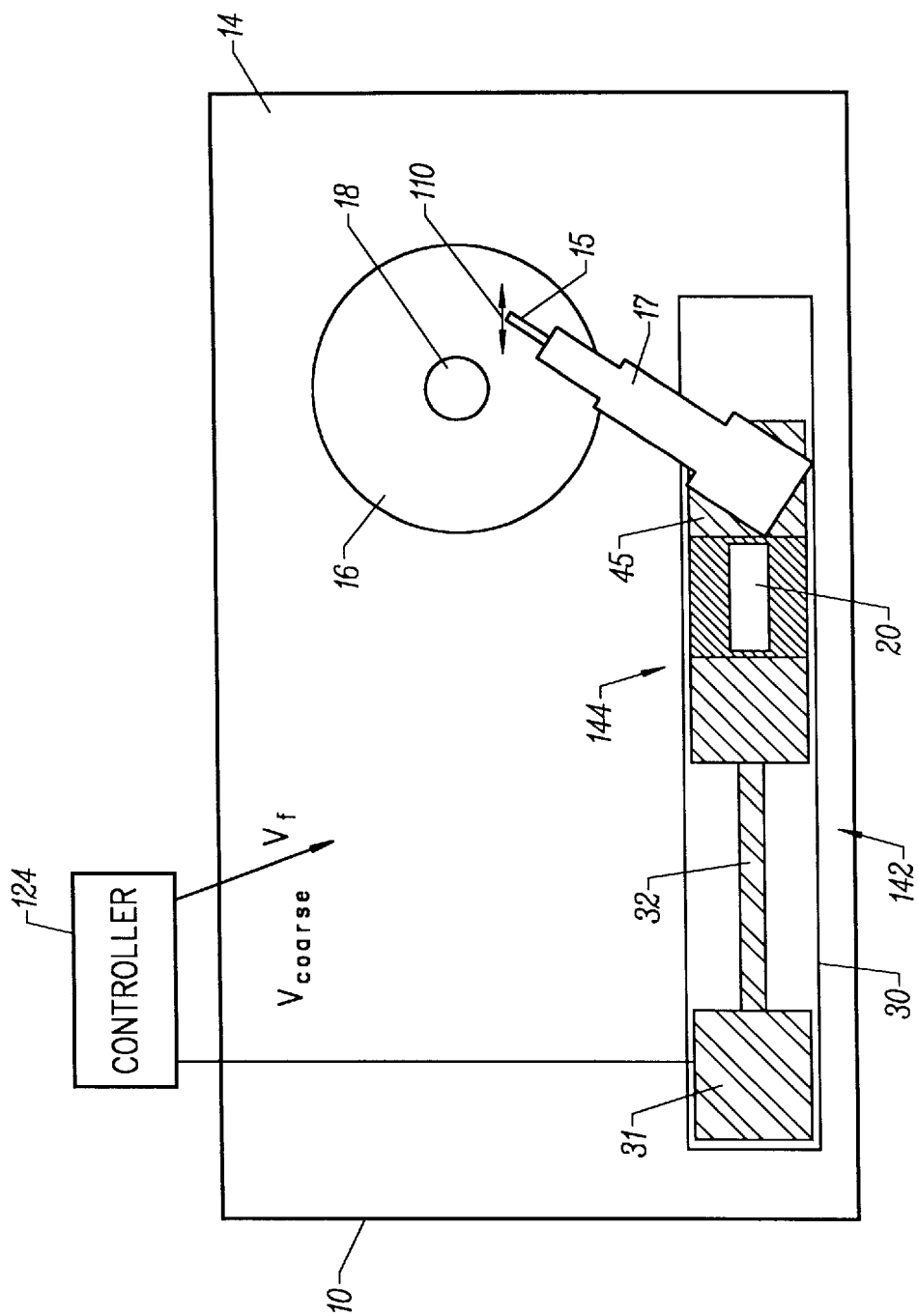
FIG. 3 is an overhead view of the micropositioner and differential field sensor of the present invention incorporated into magnetic head and disk testing equipment.

FIG. 3 illustrates a positioner assembly 142 mounted on a base plate 14 which is the base plate of a conventional spinstand. The spinstand further supports a spindle 18, which can be fixed to the base plate 14 in any required position, as well as a conventional rotary drive unit (not shown) attached to the spindle 18. The spinstand provides for the support and rotation of a magnetic disk 16 such that a magnetic head 15 affixed to the micropositioner 142 can be disposed over the magnetic disk 16 and its read/write capabilities tested. (Note that in another embodiment, the head is disposed below the disk instead of above. Note also that although directed here toward magnetic disks, the present invention could easily be directed toward optical disks.) The magnetic head 15 is attached to the head loading mechanism 17. which is in turn mounted on the fine positioning stage 45 of the flexible stage assembly 40.

The coarse positioner 30 provides for the approximate placement of the magnetic head 15 relative to the magnetic disk 16. For example, coarse positioner 30 might be used to position the head 15 generally over a desired track on the disk 16. The coarse positioner 30 may consist of any appropriate mechanism well-known in the prior art. In the embodiment shown in FIG. 3 the coarse positioner 30 comprises the stepper 31 and leadscrew 32.

The coarse positioner 30 positions a coarse positioning stage 144 relative to the spindle 18 (in the first dimension indicated by arrow 110). Mounted on the coarse positioning stage 144 is the micropositioner of FIG. 1, which provides for fine positioning of the magnetic head 15 mounted on the fine positioning stage 45, relative to the magnetic disk 16. For example, if the coarse positioner 30 positions the head 15 generally over a desired track on the disk 16, the fine positioner might be used to further adjust the displacement until the head 15 is over a desired radial part of the track. The translating means 20 is oriented such that its direction of displacement is parallel to the coarse positioner's 30 direction of movement.

While the same control circuit can be used to govern the movement of both positioners, as is done in the prior art devices, the present invention also contemplates the incorporation of a separate control circuit for each positioner. In one embodiment, the coarse positioner 30 is controlled by conventional open loop control, whereas in another embodiment, a linear encoder is attached to the coarse positioning stage and to the base plate 14 to provide a sensor for conventional closed loop control.

As discussed above in detail, the compact design and temperature sensitive components of the instant micropositioner substantially reduce the positioning errors resulting from environmental disturbances such as mechanical vibration and thermal expansion. The differential field sensor and feedback control loop of the fine positioner can achieve almost infinite resolution.

From the above, it is apparent that the present invention provides for a micropositioner that can provide superior resolution at submicron levels, while minimizing the inaccuracies caused by mechanical vibrations and thermal expansion, and without engendering uncorrectable position errors. Furthermore, it is apparent that the present invention provides for an improved method and device for detecting submicron linear displacement while substantially eliminating electromagnetic disturbances within the feedback loop.

It should again be noted that the present invention has been described in terms of the preferred embodiment. One skilled in the art will recognize that it would be possible to construct an embodiment of the present invention from a variety of materials and to modify the placement of the components in a variety of ways. For example, alternative displacement means other than the piezoelectric elements discussed herein can be combined with various sensor components for use with the flexible stage assembly described herein, and the structure of the base unit can be easily altered to accommodate different configurations required by different applications.

While the preferred embodiments have been described in detail and shown in the accompanying drawings, it will be evident that various further modifications are possible without departing from the scope of the invention as set forth in the following claims.

What is claimed is:

1. A micropositioner for translating a workpiece along a first dimension relative to a reference position, comprising:
   a coarse positioner having a first stage, said coarse positioner translating said first stage by a controllable first displacement amount relative to said reference position in said first dimension;
   a fine positioner attached to said first stage and having a second stage attachable to said workpiece, said fine positioner translating said second stage by a controllable second displacement amount relative to said first stage in said first dimension; and
   a fine positioner closed loop control circuit coupled to said fine positioning mechanism and controlling said second displacement amount in dependence upon a measurement of said second displacement amount.

2. A micropositioner according to claim 1, further comprising a coarse positioner closed loop control circuit coupled to said coarse positioner and controlling said first displacement amount.

3. A micropositioner according to claim 1, for use with a command signal indicating a desired fine displacement amount, wherein said fine positioner closed loop control circuit comprises:
   first and second electrical side plates both mounted fixedly in said first dimension relative to one of said first and second stages, said side plates being oriented so as to create an electrical field having a component in said first dimension between said side plates when a voltage difference is applied across said side plates;
   an electrical probe plate mounted fixedly in said first dimension relative to the other of said first and second stages, said probe plate sensing a voltage in said electrical field; and
   a closed loop control circuit coupled to said side plates, said probe plate and said positioning mechanism, said control circuit controlling said second displacement amount in response to said command signal and to said voltage sensed by said probe plate.

4. A micropositioner according to claim 1, wherein said fine positioner comprises:
   a parallelogram flexure having first and second opposite sides and further having third and fourth opposite sides, said first side being mounted fixedly in said first dimension relative to said first stage; and
   a positioning mechanism attached to a particular one of said second, third and fourth sides of said parallelogram flexure, said positioning mechanism translating said second side by said controllable second displacement amount in said first dimension.

5. A micropositioner according to claim 4, wherein said fine positioner further comprises:
   a base unit attached to said first stage at a first base unit attachment point and to said first side of said parallelogram flexure at a second base unit attachment point, and via which said first side of said parallelogram flexure is mounted fixedly in said first dimension relative to said first stage; and
   a piezoelectric translator having a first piezoelectric mounting point mounted fixedly in said first dimension relative to said base unit and further having a second piezoelectric mounting point mounted fixedly in said first dimension relative to said particular side of said parallelogram flexure, said piezoelectric translator having a controllable extension of said second piezoelectric mounting point relative to said first piezoelectric mounting point in said first dimension.

6. A micropositioner for positioning a stage along a first dimension relative to a reference position, in response to a command signal indicating a desired displacement amount, comprising:
   a positioning mechanism having a stage, said positioning mechanism translating said stage by an actual displacement amount relative to said reference position in said first dimension;
   first and second electrical plates both mounted fixedly in said first dimension relative to one of said reference position and said stage and opposing each other so as to create an electrical field having a component in said first dimension between said first and second plates when a voltage difference is applied across said first and second plates;
   an electrical probe mounted fixedly relative to the other of said reference position and said stage, between said first and second plates and in said electrical field, said probe sensing a probe voltage in said electrical field; and
   a closed loop control circuit coupled to said first and second plates, to said probe and to said positioning mechanism, said closed loop control circuit controlling said positioning mechanism to translate said stage in said first dimension until said probe voltage indicates that said actual displacement amount matches the desired displacement amount indicated by said command signal.

7. A micropositioner according to claim 6, wherein said control circuit comprises:
   a plate driver circuit which applies a first voltage ($V_a$) to said first plate and a second voltage ($V_b$) to said second plate, said first voltage ($V_a$) having a value which is a first function of an error signal ($V_e$), said second voltage ($V_b$) having a value which is a second function of said error signal ($V_e$), said first and second functions being different;

a feedback loop which adjusts said error signal ($V_e$) to maintain the voltage on said probe at a fixed D.C. voltage; and a positioning mechanism driver which applies a positioning signal to said positioning mechanism as a function of a difference between said error signal ($V_e$) and said command signal ($V_f$).

8. A micropositioner according to claim 6, wherein said first voltage ($V_a$) is an oscillating voltage and said second voltage ($V_b$) is an oscillating voltage oscillating out of phase with said first voltage ($V_a$).

9. A micropositioner according to claim 7, wherein said first voltage is given by $$V_a = k\ (V^+ - V_e) \sin \omega t$$

and said second voltage is given by $$V_b = k\ (V^- - V_e) \sin \omega t,$$

where k is a constant of proportionality, $V_e$ is said error signal and $V^+$ and $V^-$ are predefined D.C. voltages between which $V_e$ ranges.

10. A micropositioner according to claim 6, wherein said positioning mechanism comprises:

a parallelogram flexure having first and second opposite sides and further having third and fourth opposite sides, said first side being mounted fixedly in said first dimension relative to said reference position; and a controllable translator attached to a particular one of said second, third and fourth sides of said parallelogram flexure, said controllable translator translating said second side by said controllable second displacement amount in said first dimension.

11. A micropositioner for positioning a disk drive head at a desired radial position of a disk on a spindle, in response to a coarse positioning command signal and a fine positioning command signal, comprising:

a coarse positioner having a first stage, said coarse positioner translating said first stage by a first displacement amount relative to said spindle in a first dimension in response to said coarse positioning command signal;

a parallelogram flexure having first and second opposite sides and further having third and fourth opposite sides, said first side being mounted fixedly in said first dimension relative to said first stage and one of said second, third and fourth sides supporting said disk drive head;

a piezoelectric translator having a first piezoelectric mounting point mounted fixedly in said first dimension relative to said first stage and further having a second piezoelectric mounting point mounted fixedly in said first dimension relative to a particular one of said second, third and fourth sides of said parallelogram flexure, said piezoelectric translator having a control input and controlling extension of said second piezoelectric mounting point relative to said first piezoelectric mounting point in said first dimension in response to a signal at said control input;

a fine displacement sensor which senses a fine displacement amount being displacement of said disk drive head relative to said first stage in said first dimension; and a fine positioning feedback loop coupled to said piezoelectric translator control input and to said fine displacement sensor and controlling said piezoelectric translator to extend said second piezoelectric mounting point relative to said first piezoelectric mounting point in said first dimension in response to a difference between a fine displacement indicated by said fine displacement sensor and a desired fine displacement indicated by said fine command signal.

12. A micropositioner according to claim 11, wherein said fine displacement sensor comprises:

first and second electrical plates both mounted fixedly in said first dimension relative to one of said first and second sides of said parallelogram flexure and opposing each other so as to create an electrical field having a component in said first dimension between said first and second plates when a voltage difference is applied across said first and second plates; and an electrical probe mounted fixedly relative to the other of said first and second sides of said parallelogram flexure and between said first and second plates and in said electrical field, and wherein said fine positioning feedback loop includes:

a plate driver circuit which applies a first oscillating voltage ($V_a$) to said first plate and a second oscillating voltage ($V_b$) to said second plate, said first oscillating voltage ($V_a$) having a first amplitude which is a first function of an error signal ($V_e$), said second oscillating voltage ($V_b$) having a second amplitude which is a second function of said error signal ($V_e$), said first and second functions being different and said first oscillating voltage being out of phase with said second oscillating voltage;

a piezoelectric translator driver which applies a signal to said piezoelectric translator as a function of a difference between said error signal ($V_e$) and said fine positioning command signal ($V_f$); and a feedback loop which adjusts said error signal ($V_e$) to maintain the voltage on said probe at a fixed D.C. voltage.

13. A micropositioner according to claim 12, wherein said disk has tracks, further comprising a controller providing said coarse and fine positioning command signals, said controller signalling said coarse positioner via said coarse positioning command signal to position said first stage such that said disk drive head is generally over or under a desired one of said disk tracks, and said controller further signalling via said fine positioning command signal a desired fine displacement relative to said desired disk track.

* * * * *

Disclaimer and Dedication 5,808,435—Michael Mager, San Jose, Calif. MICROPOSITIONING DEVICE FOR DISK HEAD TESTING SYSTEM. Patent dated September 15, 1999. Disclaimer and Dedication filed March 19, 2001, by the assignee KMY Instruments.

Hereby enters this disclaimer and dedication to all claims of said patent.

*(Official Gazette, June 5, 2001)*